(12) United States Patent
Tener et al.

(10) Patent No.: US 10,077,971 B1
(45) Date of Patent: Sep. 18, 2018

(54) RISLEY PRISM LINE-OF-SIGHT CONTROL FOR STRAPDOWN MISSILE

(75) Inventors: Gene D. Tener, Oviedo, FL (US); Andrew H. Hawkins, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 2487 days.

(21) Appl. No.: 12/168,664

(22) Filed: Jul. 7, 2008

(51) Int. Cl.
*F41G 7/22* (2006.01)
*F41G 7/00* (2006.01)

(52) U.S. Cl.
CPC ............ *F41G 7/22* (2013.01); *F41G 7/2226* (2013.01); *F41G 7/2253* (2013.01)

(58) Field of Classification Search
CPC .......... F41G 7/2226; F41G 7/007; F41G 7/20; F41G 7/22; F41G 7/2253; H04N 56/3635; G02B 26/0891
USPC ............... 455/3.17; 244/3.1, 3.15, 3.16, 3.17
See application file for complete search history.

(56) References Cited

U.S. PATENT DOCUMENTS

| | | | | |
|---|---|---|---|---|
| 4,950,056 A | * | 8/1990 | Smith | 359/366 |
| 5,249,046 A | * | 9/1993 | Ulich et al. | 348/31 |
| 6,343,767 B1 | | 2/2002 | Sparrold et al. | |
| 6,344,937 B1 | | 2/2002 | Sparrold et al. | |
| 6,853,349 B1 | | 2/2005 | Chishinski | |
| 7,058,277 B1 | | 6/2006 | Harkrider et al. | |
| 7,236,299 B1 | * | 6/2007 | Smith | 359/402 |
| 2007/0024978 A1 | | 2/2007 | Jackson et al. | |

FOREIGN PATENT DOCUMENTS

| | | |
|---|---|---|
| EP | 1357398 A2 | 10/2003 |
| WO | WO-01/75388 A1 | 10/2001 |
| WO | WO-01/75506 A1 | 10/2001 |

OTHER PUBLICATIONS

C. Schwarze, "A New Look at Risley Prisms"; posted on the Internet at photonics.com; originally printed in "Photonics Spectra" magazine; Jun. 2006.*

* cited by examiner

*Primary Examiner* — Bernarr E Gregory
(74) *Attorney, Agent, or Firm* — Withrow & Terranova, PLLC

(57) ABSTRACT

An optical system and method comprising refracting light with a pair of Risley prisms and employing a line-of-sight control unit to adjust the pair.

20 Claims, 2 Drawing Sheets

RISLEY PRISM LINE-OF-SIGHT CONTROL FOR STRAPDOWN MISSILE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to line-of-sight controls for missile systems, particularly for strapdown missile systems.

Description of Related Art

Missile seekers require a large field of regard (FOR) to acquire and track objects that are not along the missile center-line. In addition, the seekers require Narrow Field of View (NFOV) to get the pixels on target needed for Automatic Target Recognition Automatic Target Correlation (ATC/ATR) functions. The high ratio of FOR to FOV preclude a strap-down solution in most missile seeker applications. However, the present invention provides such ability.

BRIEF SUMMARY OF THE INVENTION

The present invention is of an optical system and method comprising: refracting light with a pair of Risley prisms; and employing a line-of-sight control unit to adjust the pair. In the preferred embodiment, no gimbals are employed for line-of-sight control. The prisms and control unit can be incorporated into a missile seeker/strapdown missile. Preferably units and also included for one or more of non-uniformity compensation, dead pixel replacement, bilinear interpolation, frame summation, and scene correlation.

The present invention is also of a missile seeker and missile seeking method comprising: refracting light with a pair of Risley prisms; and employing a line-of-sight control unit in a missile to adjust the pair. In the preferred embodiment, no gimbals are employed for line-of-sight control. An electronic stabilization unit receives output from the pair. The invention can be operated in a strapdown missile. Preferably units are also included for one or more of non-uniformity compensation, dead pixel replacement, bilinear interpolation, frame summation, and scene correlation.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed nut in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a strap-down missile seeker comprising a line-of-sight control comprising a Risley prism pair and not requiring a gimbal. Preferably the missile seeker employs electronic stabilization in conjunction with the line-of-sight control of the invention.

The common method of line-of-sight (LOS) control for missile seekers is to use gimbals. They provide two basic functions: LOS pointing and LOS stabilization. The LOS stabilization aspect can be achieved electronically by using a high frame rate Focal Plane Array (FPA) coupled with image correlation. The present invention solves the LOS pointing aspect using a Risley prism pair to steer the LOS over the FOR. Risley prisms have not heretofore been applied to strapdown missile seeker applications. The combination of electronic stabilization and Risley prisms results in significant cost reduction, fewer moving parts, and fewer failure points in missile seekers.

Gimbals are expensive, require precision alignment, must be well balanced about the gimbal axes, and electrical/gas line interfaces off-gimbal create friction and spring torques resulting in increased LOS jitter. The present invention provides the same functionality at a lower cost and eliminates the gimbal interface issues. This invention is preferably used with fast-framing and electronic stabilization to also provide the gimbal stabilization function.

Figure 1:
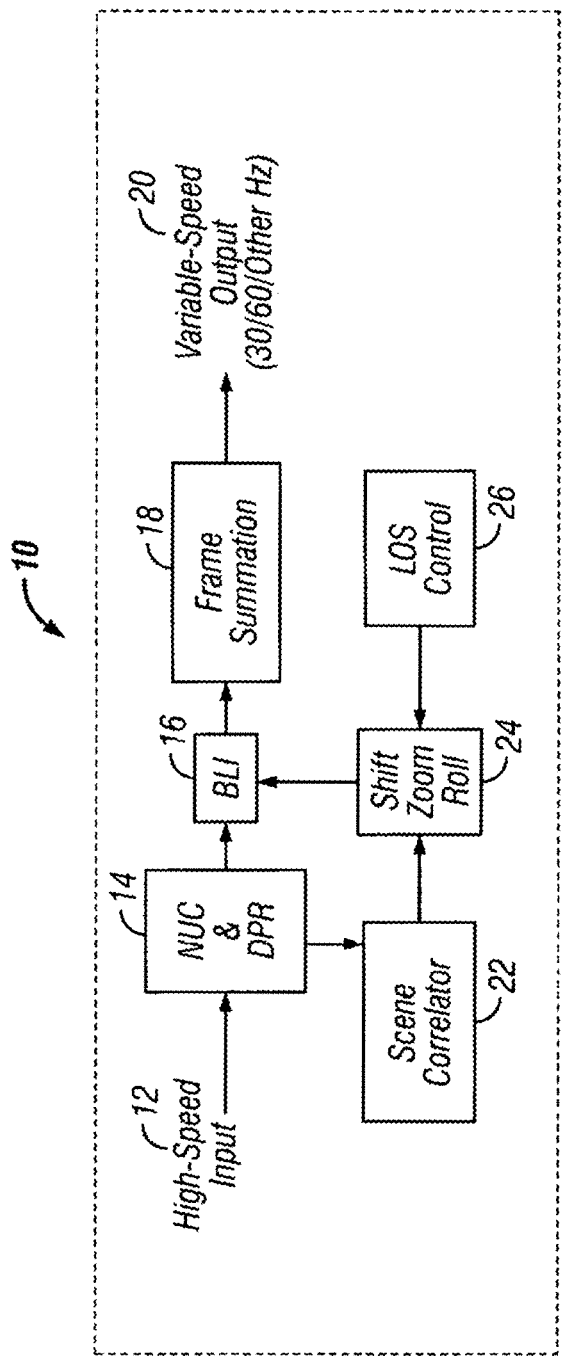
FIG. 1 is a block diagram of the strapdown missile seeker of the invention.
Figure 2:
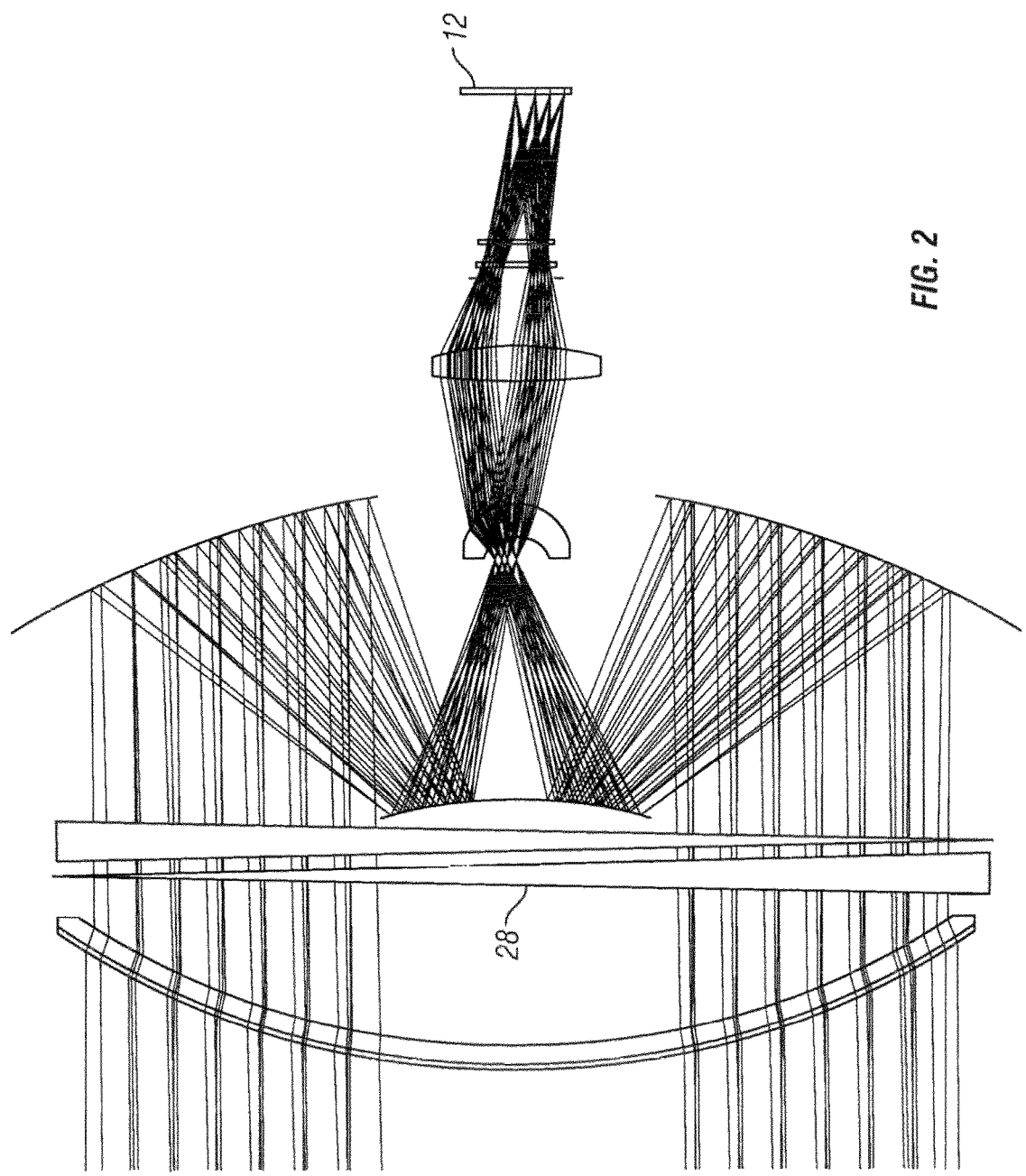
FIG. 2 is a schematic diagram of the use of a Risley prism pair in the line-of-sight control for the invention.

The strapdown missile seeker 10 of the invention is shown schematically in FIG. 1. It preferably comprises high speed input 12 (such as an FPA), non-uniformity compensation and dead pixel replacement unit (NUC and DPR) 14, bilinear interpolator (BLI) 16, frame summation 18, variable speed output 20 (e.g., 30 Hz, 60 Hz, and/or other speeds), scene correlator 22, shift/zoom/roll controller 24, and LOS control unit 26. FIG. 2 shows the use of an optical system comprising Hisley prism pair 28 to steer LOS for projection on FPA 12. LOS control unit 26 adjusts Risley prism pair 28 to steer the LOS in desired directions according to commands received by LOS control unit 26.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An optical system comprising:
a pair of Risley prisms;
a line-of-sight control unit adjusting said pair; and
a non-uniformity compensation unit.

2. The optical system of claim 1 wherein said system employs no gimbals for line-of-sight control.

3. The optical system of claim 1 wherein said optical system is incorporated into a missile seeker.

4. The optical system of claim 3 wherein said optical system is incorporated into a strapdown missile.

5. The optical system of claim 1 wherein said optical system further comprises units for one or more of the group consisting of dead pixel replacement, bilinear interpolation, frame summation, and scene correlation.

6. A missile seeker comprising an optical system comprising:
a pair of Risley prisms;
a line-of-sight control unit adjusting said pair; and
a non-uniformity compensation unit.

7. The missile seeker of claim 6 wherein said system employs no gimbals for line-of-sight control.

8. The missile seeker of claim 7 additionally comprising an electronic stabilization unit receiving output from said optical system.

9. The missile seeker of claim 6 wherein said missile seeker is incorporated into a strapdown missile.

10. The missile seeker of claim 6 wherein said optical system further comprises units for one or more of the group consisting of dead pixel replacement, bilinear interpolation, frame summation, and scene correlation.

11. An optical method comprising the steps of:
refracting light with a pair of Risley prisms;
employing a line-of-sight control unit to adjust the pair; and
compensating for non-uniformity with a non-uniformity compensating unit.

12. The optical method of claim 11 wherein no gimbals are employed for line-of-sight control.

13. The optical method of claim 11 wherein the prisms and control unit are incorporated into a missile seeker.

14. The optical method of claim 13 wherein the prisms and control unit are incorporated into a strapdown missile.

15. The optical method of claim 11 additionally comprising employing units for one or more of the group consisting of dead pixel replacement, bilinear interpolation, frame summation, and scene correlation.

16. A missile seeking method comprising the steps of:
refracting light with a pair of Risley prisms;
employing a line-of-sight control unit in a missile to adjust the pair; and
compensating for non-uniformity with a non-uniformity compensating unit.

17. The missile seeking method of claim 16 wherein no gimbals are employed for line-of-sight control.

18. The missile seeking method of claim 17 additionally comprising employing an electronic stabilization unit receiving output from the pair.

19. The missile seeking method of claim 16 wherein the method is employed in a strapdown missile.

20. The missile seeking method of claim 16 additionally comprising employing units for one or more of the group consisting of dead pixel replacement, bilinear interpolation, frame summation, and scene correlation.

* * * * *